United States Patent [19]

Batlivala et al.

[11] Patent Number: 4,479,245
[45] Date of Patent: Oct. 23, 1984

[54] SAME FREQUENCY REPEATER FOR A MULTIPLE REPEATER SYSTEM

[75] Inventors: Percy P. Batlivala, Arlington Heights; Richard S. Kommrusch, Schaumburg, both of Ill.

[73] Assignee: Motorola, Inc., Schaumburg, Ill.

[21] Appl. No.: 451,678

[22] Filed: Dec. 21, 1982

[51] Int. Cl.³ .............................................. H04B 7/14
[52] U.S. Cl. ........................................ 455/18; 455/9; 455/51; 375/70
[58] Field of Search .................. 455/9, 10, 15, 16, 18, 455/24, 51, 78, 79; 370/32; 375/68–70; 179/170 A

[56] References Cited
U.S. PATENT DOCUMENTS

| | | | |
|---|---|---|---|
| 2,719,284 | 9/1955 | Roberts et al. | 455/18 |
| 2,734,131 | 2/1956 | Magnuski . | |
| 2,883,522 | 4/1959 | Brosch . | |
| 2,978,699 | 4/1961 | Dodington | 455/18 |
| 3,745,462 | 7/1973 | Trimble . | |
| 3,825,829 | 7/1974 | Braun | 455/24 |
| 4,056,780 | 11/1977 | Faulkner . | |
| 4,197,496 | 4/1980 | Hiyama | 455/16 |
| 4,317,217 | 2/1982 | Davidson et al. . | |

Primary Examiner—Jin F. Ng
Attorney, Agent, or Firm—Charles L. Warren; James W. Gillman; Edward M. Roney

[57] ABSTRACT

This invention is directed to a same frequency repeater (SFR) for use in a multiple SFR system in which only one SFR at a given time is allowed to retransmit a received signal thereby preventing simulcast distortion which could occur due to multiple SFR retransmissions. The SFR includes a receiver for receiving a signal carrying information at a given frequency and a transmitter for rebroadcasting the received signal at the given frequency. A mechanism is provided for keying the transmitter upon the reception of a received signal. A detector senses if a predetermined pilot tone is carried by the received signal. A mechanism responsive to the detection of the pilot tone inhibits the keying of the transmitter if the pilot tone is detected before the transmitter is keyed. A tone generator encodes the output signal of the transmitter with the pilot tone. The keying mechanism preferably delays the keying of the transmitter for a time period having a duration inversely proportional to the magnitude of the received signal in response to a mechanism which senses the magnitude of the received signal. The present invention further contemplates a method for the operation of such an SFR.

8 Claims, 2 Drawing Figures

SAME FREQUENCY REPEATER FOR A MULTIPLE REPEATER SYSTEM

BACKGROUND OF THE INVENTION

This invention relates generally to a same frequency repeater (SFR) and relates more specifically to an apparatus and method for preventing simulcast distortion in a multiple SFR system.

An SFR is a transceiver that receives a relatively low power RF signal at a particular frequency and rebroadcasts the information carried by the received signal at the same or nearly the same frequency but at a higher power level. An SFR is also referred to as a single frequency repeater. The SFR differs from a conventional repeater which rebroadcasts the received signal at a frequency substantially different from that of the received frequency. A plurality of spaced apart repeaters can extend the area in which a portable or mobile unit can talk-in or communicate with a base station.

In an SFR system in which two or more SFR's can receive a signal transmitted from a mobile unit in an overlapping area of coverage, simulcast distortion may occur. The term simulcast distortion is used to describe interference which occurs when two signals containing the same information, such as voice modulation, are received with one signal delayed in the order of 100 microseconds or longer relative to the other. The audio detected by the base station receiver may exhibit simulcast distortion if two or more SFR's simultaneously rebroadcast a mobile signal because of the time differences which may exist between the two or more retransmitted signals.

Another type of simulcast distortion may occur if a second SFR receives the signal from a first SFR and retransmits same. The audio retransmitted by the second SFR will be time delayed relative to the audio signal transmitted by the first SFR due to the propagation delay between the first and second SFR, and the time required for the signal received by the second SFR to traverse the second SFR. Thus, the base station receiver will receive information retransmitted by the second SFR time delayed relative to the same information transmitted by the first SFR thereby resulting in simulcast distortion. Although, precautions can be taken to provide isolation between the SFR's, it is difficult in practice to achieve sufficient isolation to prevent each SFR from receiving a signal transmitted by another SFR.

It is an object of this invention to prevent simulcast distortion in a multiple SFR system by preventing the concurrent transmission by two or more SFR's in the system.

Another object of this invention is to select the SFR having the strongest received signal from a mobile unit for retransmitting the signal.

A further object of the present invention is to provide a means for selecting only one SFR to retransmit a mobile signal wherein several SFR's receive the same mobile signal at approximately the same signal strength.

Another object of the invention is to provide a method for controlling each SFR in a system having multiple SFR's to prevent the concurrent transmission from two or more of the SFR's.

PRIOR ART

Systems have utilized a mobile transceiver as a repeater to provide a communication link between a portable unit operating at one frequency and a base station operating at another frequency. Only one repeater is activated in response to a received signal. The repeater having the shortest random time delay following the reception of a signal transmits a control signal preventing other repeaters which may be in the same area from activating, that is, retransmitting the signal. U.S. Pat. Nos. 4,056,780 and 3,745,462 are illustrative of such a system.

Other communication systems such as disclosed in U.S. Pat. Nos. 2,883,522 and 2,734,131 provide a series of spatially separated repeaters which are in communication with each other via microwave links. The repeater receiving the strongest mobile signal locks out the other repeaters by providing a control signal generated after a time delay inversely proportional to the strength of the mobile's signal. The control signal is carried by the microwave links to the other repeaters to lock the latter out. U.S. Pat. No. 2,734,131 discloses the use of a balance bridge associated with the microwave communication channel for selecting a repeater where two or more repeaters receive a mobile signal having the same signal strength.

U.S. Pat. No. 4,317,217 is directed to the cancellation of the spillover signal from the transmitter to the receiver in a same frequency repeater. A tagged signal is added to the received signal so that the spillover signal from the transmitter can be differentiated from the desired received signal. A cancellation network responsive to the tagged signal cancels the spillover from the transmitter.

SUMMARY OF THE INVENTION

The purpose of this invention is to provide an SFR for use in a multiple SFR system wherein the simulcast distortion problem caused by two or more SFR's transmitting concurrently is eliminated. This invention also contemplates a method for achieving this purpose.

An embodiment of an SFR according to the present invention includes a receiver for receiving a signal carrying information at a given frequency and a transmitter for transmitting an output signal at the given frequency. A means is provided for keying the transmitter in response to the reception of a received signal. A detector senses if a predetermined pilot signal is carried by the received signal. A means responsive to the detection of the pilot signal is provided to inhibit the keying of the transmitter if the pilot signal is dectected before the transmitter has been keyed.

The SFR also includes means for sensing the magnitude of the received signal. The transmitter keying means preferably delays the keying of the transmitter from the time that a signal is received for a time period having a duration inversely proportional to the magnitude of the received signal. The SFR may further include means for unkeying the transmitter for a randomly selected time period in response to the detection of the pilot signal while the transmitter is keyed. An encoding means is provided for encoding the output signal of the transmitter with the predetermined pilot signal.

DETAILED DESCRIPTION

Figure 1:
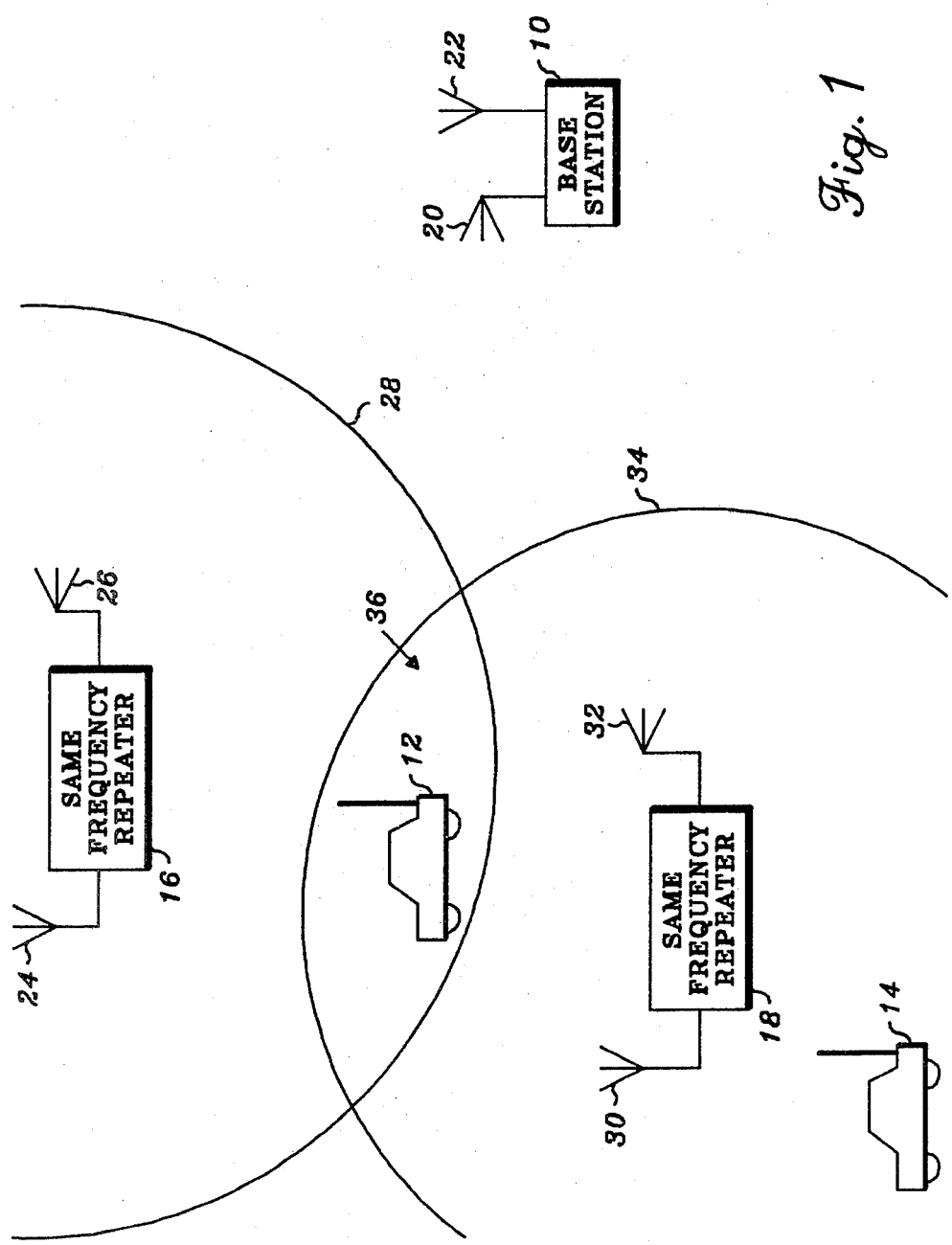
FIG. 1 is a diagrammatic representation of a multiple SFR system.

FIG. 1 illustrates a communication system including a base station 10, mobile units 12 and 14 each including a transceiver, and same frequency repeaters 16 and 18. The purpose of the SFR's in this illustrative system is to increase the talk-in range of the mobile units to the base station. Thus, each SFR is capable of receiving a signal from a mobile unit, amplifying this signal, and rebroadcasting same to the base station.

The base station 10 has at least one antenna 20 for receiving signals transmitted by the SFR's and another antenna 22 for transmitting a signal from the base station to the mobile units. Antenna 22 or an additional antenna can be used for receiving signals directly from the mobile units. Antenna 22 is preferably vertically polarized since this represents the normal polarization of antennas associated with mobile and portable units. Antenna 20 is preferably a horizontally polarized antenna oriented to receive signals from the SFR's. The base station may include a scanning network for sequentially coupling each of the receiving antennas to the receiver in order to search for a signal. Alternatively, the base station may contain a receiver for each of the receiving antennas.

The SFR 16 may include a vertically polarized antenna 24 for receiving signals from mobile units and a horizontally polarized directive antenna 26 for transmitting signals from the SFR to the base station. A generally circular area 28 defines the spacial area within which a mobile unit can be received by this SFR. An SFR 18 similarly includes a receiving antenna 30, a transmitting antenna 32, and can receive a signal transmitted by mobile unit within area 34. An area 36 which is common with both areas 28 and 34 defines a region from which a mobile unit 12 will be received by SFR 16 and 18. Thus, this region represents overlapping reception coverage by adjacent SFR's. Mobile units not within an overlapping coverage area, such as mobile 14, will be received by only one SFR.

Figure 2:
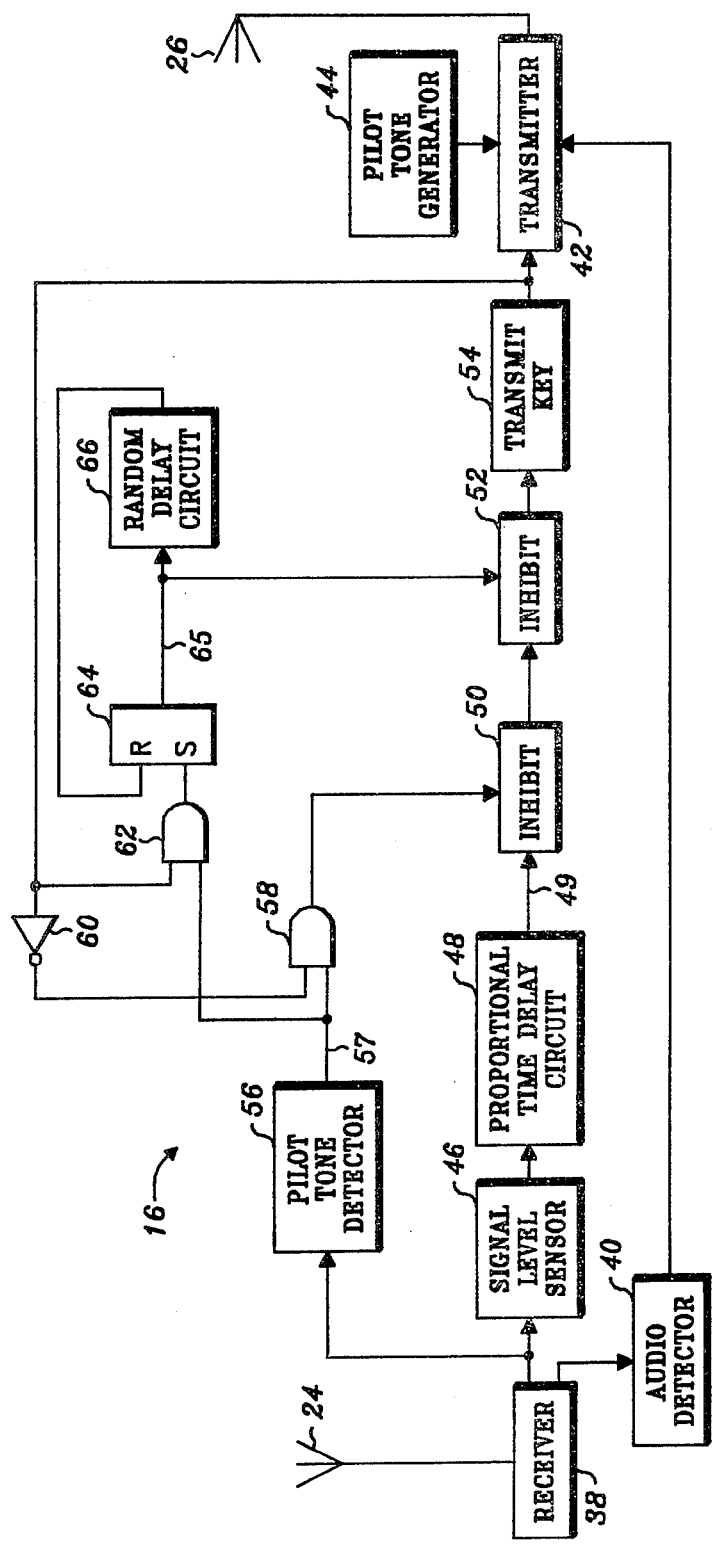
FIG. 2 is a block diagram of an embodiment of an SFR according to the present invention.

FIG. 2 is a block diagram of an illustrative embodiment of SFR 16. Since each of the SFR's in the system are similar, the following explanation of the structure and operation of SFR 16 will serve as an explanation for each SFR in the system. The SFR 16 includes a receiver 38 coupled to antenna 24 for receiving a signal at a given frequency. An audio detector 40 recovers the information, such as a voice signal, received by receiver 38 and couples same to transmitter 42, thereby modulating the transmitter with the received information. A pilot tone generator 44 also modulates the transmitter with a predetermined pilot signal thereby providing a means for encoding the transmitter signal with the pilot signal. Thus, the transmitter, when keyed or turned on, transmits a signal which carries a pilot tone and the received voice signal via antenna 26.

The purpose of the remainder of the elements of FIG. 2 is to control the keying of transmitter 42. A signal level sensor 46 connected to the receiver 38 senses the level, that is, the strength or magnitude, of the received signal and provides an output proportional to the strength of the received signal to a proportional time delay circuit 48. Circuit 48 may consist of a delay circuit having a variable delay interval selected in inverse portion to the strength of the received signal as sensed by sensor 46. The output 49 of delay circuit 48 consists of a control signal coupled through inhibit gates 50 and 52 to a transmitter key circuit 54 for keying transmitter 42. Assuming inhibit gates 50 and 52 are not inhibited, the transmitter will be keyed upon the reception of a signal by the receiver after a time delay having a period inversely proportional to the strength of the received signal. Of course, a security system may also require the detection of an access code to constitute a valid signal.

A pilot tone detector 56 which is coupled to receiver 38 has a output 57 whose state corresponds to whether or not a predetermined pilot tone is carried by the received signal. The output 57 of the detector provides one input to AND gate 58. The output of transmitter key circuit 54, after being inverted by inverter 60, comprises the other input to gate 58. The output of AND gate 58 controls inhibit gate 50, such that the output 49 from delay circuit 48 cannot pass to key the transmitter if gate 50 is inhibited. Inhibit gate 50 is inhibited when a pilot tone is detected and the transmitter is not keyed. This circuit provides a means for preventing transmitter 42 from being keyed as long as the pilot tone is received.

An AND gate 62 receives one input from the transmitter key circuit 54 and the other input from pilot tone detector 56. The output of gate 62 is coupled to the set input of flipflop 64. The output 65 of the flipflop is coupled to inhibit gate 52 to control same and is coupled to a random delay circuit 66. Circuit 66 consists of a delay network having a time delay which is randomly selected within a predetermined range. The output of the delay circuit is coupled to the reset input of flipflop 64 to reset it following the time delay determined by circuit 66. Upon being set by gate 62, the flipflop causes gate 52 to be inhibited thereby unkeying (turning off) the transmitter. Thus, this circuitry provides a means for unkeying the transmitter for a random duration upon the detection of a pilot tone by detector 57.

For this SFR to operate properly within a system containing multiple like SFR's, the receiver 38 must not be responsive to the signal (and pilot tone) generated by transmitter 42. Conventional means for obtaining isolation between the receiver and transmitter may include a means for cancelling the spillover RF signal from the transmitter such as disclosed in previously referenced U.S. Pat. No. 4,317,217.

The SFR may experience three modes of operation. In response to a received signal not carrying the pilot tone, such as from a mobile unit, the transmitter will be keyed after a time delay proprotional to the strength of the received signal.

Upon the reception of a signal initially carrying the predetermined pilot tone, such as from another SFR, the proprotional time delay circuit 48 will attempt to key the transmitter after a time delay proportional to signal strength, but, will be unable to key the transmitter because gate 50 will inhibit the keying of the transmitter as long as the pilot tone is detected.

In the third mode of operation, the transmitter has been previously keyed by the receipt of a signal which did not contain the pilot tone. The subsequent detection of the presence of a pilot tone caused by the keying of another SFR will cause the transmitter to be unkeyed for a random time period determined by circuit 66. At the expiration of the random time delay, the transmitter: will remain unkeyed if no signal is detected; will be rekeyed if a signal is present and a pilot tone is not detected; or will remain unkeyed by gate 50 due to the detection of a signal carrying the pilot tone.

The operation of such SFR's in a system containing a plurality of SFR's will result in a system in which the base staion will not be subjected to simulcast distortion due to more than one SFR rebroadcasting the same signal. Assume that mobile unit 14 initiated a transmission which is received only by SFR 18. The transmitter of this SFR will be keyed following a delay proportional to the strength of the received signal. It should be noted that the mobile units will not transmit a signal carrying the predetermined pilot tone. In addition to the base station receiving the rebroadcast signal by SFR 18, adjacent SFR 16 will also receive the retransmitted signal due to the distance between adjacent SFR's and the substantial power level of the SFR transmitters. Although, SFR 16 will receive the retransmitted signal from SFR 18, the transmitter of SFR 16 will not be keyed because its receiver will detect the presence of the pilot tone which is present on the signal transmitted by SFR 18. Thus, SFR 16 and any other SFR in the system which receives the signal from SFR 18 will not activate its transmitter due to the presence of the pilot tone transmitted by SFR 18.

A mobile unit 12 within the overlapping reception region 36 will be received by both SFR 16 and 18. Because of the proportional time delay circuit 48 in each of the SFR's, the SFR which receives the greater signal strength will be the first transmitter to be keyed. Assume that SFR 18 receives the stronger signal and is the first to key. SFR 18 upon being keyed will transmit a signal containing the pilot tone which will be received by SFR 16 along with the mobile unit's signal. If the transmitter of SFR 16 has not been keyed prior to the detection of the pilot tone, its transmitter will be locked out by inhibit gate 50. Thus, even a mobile unit in an area of common reception will not cause the simultaneous transmission by two SFR's assuming that the signal transmitted by the first keyed SFR is received by the other SFR prior to the latter being keyed.

If mobile unit 12 is located within a common coverage area 36, it will be possible that SFR 16 and 18 will receive the mobile signal at substantially the same signal strength thereby causing the transmitter of each SFR to key simultaneously. Upon the keying of both SFR's, the receiver in each SFR will receive and the other SFR's signal and will detect the pilot tone carried by it. This will cause both SFR's to be unkeyed for a random time delay controlled by circuit 66 in each. The SFR having the shorter time delay will be the first to rekey in response to the mobile signal and will rebroadcast the signal with the pilot tone. The other SFR having the longer random time delay will receive the pilot tone generated by the other SFR prior to rekeying its transmitter. Thus, the first SFR to rekey will lock out the other SFR thereby avoiding a simulcast transmission condition even though each SFR transmitter was originally keyed at substantially the same time in response to the reception of a mobile signal.

The present invention also contemplates that a system requiring an identification code could be utilized with this SFR system. For example, the mobile units could transmit a signal carrying an access tone which would be required to be received by the receivers of the SFR's to constitute a valid received signal. The pilot tone generated by the SFR's would be selected to be a different tone (frequency) than the access tone so that the SFR's could differentiate between a signal received from a mobile and a signal received from another SFR. The base station receiver would recognize both a signal carrying the access tone and a signal carrying the pilot tone. Thus, the present invention is compatible with the use of other coded systems.

The present invention could be incorporated in a two way FM communication system operating at a frequency of 800 Mhz. In this example, the pilot tone could consist of a low level FM signal having a frequency outside the nominal voice band, such as above 5 Khz. The time for one SFR to detect the pilot tone transmitted by another line of sight SFR might require approximately 5 milliseconds. The random time delay circuit could randomly select a time delay within the approximate range from 10 to 50 milliseconds.

The method of operation of a same frequency repeater according to the present invention contemplates the use of two or more SFR's in a communication system. A first SFR receives an RF signal and determines if a predetermined pilot signal is carried by the received signal. The transmitter of the SFR is keyed in response to the reception of the RF signal if the pilot signal is not present. The transmitter is encoded to transmit the predetermined pilot signal. The keying of the transmitter is preferably delayed for a time period having a duration inversely proportional to the magnitude or strength of the received RF signal. This selects the SFR with the stronger received signal to be keyed first where several SFR's receive a signal from a mobile unit. Should two of the transmitters of the SFR's key substantially simultaneously, each transmitter upon receiving the pilot signal from the other SFR is unkeyed for a randomly selected time period wherein the SFR having the shorter random delay will rekey first thereby locking out the other SFR.

The present invention provides several advantages. For example, additional SFR's may be added to an existing SFR system to provide a larger area of coverage for mobile units by merely placing additional SFR's at appropriate spatial locations relative to the existing SFR's. This is possible since each SFR can be identical and can operate independent of other controls. Another advantage is that the SFR with the strongest received signal, and hence the highest signal to noise ratio, is automatically selected.

Although, an embodiment of the present invention has been described above and illustrated in the drawings, the scope of the present invention is defined by the claims appended hereto.

What is claimed is:
1. A same frequency repeater comprising:
(a) a receiver for receiving a signal carrying information at a given frequency;
(b) a transmitter for transmitting an output signal carrying said information at said given frequency;
(c) means for sensing the magnitude of said received signal;
(d) means for keying said transmitter in respone to said receiver receiving said signal, said keying means delaying the keying of said transmitter from the time that said receiver receives said signal for a time period having a duration inversely proportional to the magnitude of said received signal as sensed by said sensing means
(e) means coupled to said receiver for detecting if a predetermined pilot signal is carried by said received signal;
(f) means for encoding said output signal of the transmitter with said predetermined pilot signal; and
(g) means for unkeying said transmitter for a randomly selected time period in response to said detecting means detecting said pilot signal while said transmitter is keyed.

2. The same frequency repeater according to claim 1 further comprising means responsive to said detecting means for inhibiting the keying of said transmitter if said pilot signal is detected by said detecting means before said keying means has keyed said transmitter.

3. A same frequency repeater comprising:
   (a) a receiver for receiving a signal carrying information at a given frequency;
   (b) a transmitter for transmitting an output signal carrying said information at said given frequency;
   (c) means for keying said transmitter in response to said receiver receiving said signal;
   (d) means coupled to said receiver for detecting if a predetermined pilot signal is carried by said received signal;
   (e) means responsive to said detecting means for inhibiting the keying of said transmitter if said pilot signal is detected by said detecting means before said keying means has keyed said transmitter;
   (f) means for encoding said output signal of the transmitter with said predetermined pilot signal; and
   (g) means for unkeying said transmitter for a randomly selected time period in response to said detecting means detecting said pilot signal while said transmitter is keyed.

4. In a communications system including at least a first and second same frequency repeater (SFR) each having a receiver for receiving an input signal at a certain frequency and a transmitter for transmitting an output signal at said certain frequency, said first and second SFR spaced apart to define an area of overlapping reception wherein a signal from a mobile unit, when in said area, will be received by both SFR's, the improvement comprising each SFR including means for keying said transmitter in response to said receiver receiving an input signal, means coupled to said receiver for detecting if a predetermined pilot signal is carried by said input signal, means for inhibiting the keying of said transmitter if said pilot signal is detected by said detecting means before said keying means has keyed said transmitter, and means for encoding said output signal of the transmitter with said predetermined pilot signal, whereby the second SFR will not key its transmitter in response to receiving an output signal from the first SFR.

5. The improvement according to claim 4 wherein each SFR further comprises means for sensing the magnitude of said input signal, said keying means delaying the keying of said transmitter from the time that said receiver receives said signal for a time period having a duration inversely proportional to the magnitude of said input signal, whereby the SFR which receives the strongest signal from a mobile unit within the overlapping reception area will be the first SFR to key its transmitter thereby causing the other SFR not to key its transmitter due to the reception by the other SFR of the pilot signal from the keyed SFR.

6. The improvement according to claim 4 or 5 wherein each SFR further comprises means for unkeying said transmitter for a randomly selected time period in response to said detecting means detecting the presence of said pilot signal while said transmitter is keyed.

7. A method of operation for a same frequency repeater (SFR) having a receiver and transmitter comprising the steps of:
   (a) receiving an RF signal at a given frequency;
   (b) detecting if a predetermined pilot signal is being carried by said received signal;
   (c) keying (turning ON) the transmitter in response to receiving an RF signal which does not carry said pilot signal;
   (d) encoding said predetermined pilot signal upon the transmitter output signal; and
   (e) unkeying the transmitter for a randomly selected time period in response to the detection of said pilot signal while the transmitter is keyed.

8. The method according to claim 7 further comprising the steps of sensing the magnitude of the received RF signal and delaying the keying of the transmitter from the time that the receiver receives the RF signal for a time period having a duration inversely proportional to the magnitude of the RF signal, whereby the greater the magnitude of the received RF signal, the faster the transmitter is keyed.

* * * * *

UNITED STATES PATENT AND TRADEMARK OFFICE
CERTIFICATE OF CORRECTION

PATENT NO. : 4,479,245
DATED : October 23, 1984
INVENTOR(S) : Batlivala et al.

It is certified that error appears in the above-identified patent and that said Letters Patent is hereby corrected as shown below:

Col. 3, line 53, "transmitter signal" should be
-- transmitter output signal --

Col. 6, line 53, "respone" should be -- response --

Signed and Sealed this

Sixteenth Day of April 1985

[SEAL]

Attest:

DONALD J. QUIGG

Attesting Officer

Acting Commissioner of Patents and Trademarks